United States Patent [19]
Bricker

[11] Patent Number: 4,649,616
[45] Date of Patent: Mar. 17, 1987

[54] METHOD FOR MOLDING A PLASTIC FERRULE FOR USE IN CONNECTORS FOR OPTICAL FIBERS

[75] Inventor: Michael W. Bricker, Brodbecks, Pa.
[73] Assignee: AMP Incorporated, Harrisburg, Pa.
[21] Appl. No.: 775,933
[22] Filed: Sep. 9, 1985

Related U.S. Application Data

[63] Continuation of Ser. No. 667,245, Nov. 1, 1984, abandoned.

[51] Int. Cl.⁴ .................. B23Q 17/00; B22C 21/14
[52] U.S. Cl. .................................... 29/406; 164/397
[58] Field of Search ............ 164/397, 398, 399; 264/1.5; 29/406

[56] References Cited

U.S. PATENT DOCUMENTS

| | | | |
|---|---|---|---|
| 1,428,620 | 9/1922 | Wilber | 29/406 |
| 1,448,528 | 3/1923 | Elliott | 29/406 |
| 2,828,536 | 4/1958 | Kaiser | 29/406 |
| 2,843,928 | 7/1958 | Gandy | 29/406 |
| 3,082,013 | 3/1963 | Thielenhaus | 29/406 |
| 3,093,873 | 6/1963 | McFall et al. | 164/398 |
| 3,416,154 | 12/1968 | Heller et al. | 29/406 X |
| 3,509,938 | 5/1970 | Pierrel | 164/397 |
| 4,292,260 | 9/1981 | Cheung | 264/1.5 |

FOREIGN PATENT DOCUMENTS

| | | | |
|---|---|---|---|
| 232685 | 6/1944 | Switzerland | 29/406 |
| 256956 | 9/1926 | United Kingdom | 164/398 |

*Primary Examiner*—Howard N. Goldberg
*Assistant Examiner*—Irene Graves Golari
*Attorney, Agent, or Firm*—Anton P. Ness

[57] ABSTRACT

An article is molded in a mold cavity where the article has a profiled bore extending axially therethrough which has a precisely centered small diameter bore section at one end thereof. A mold cavity is defined by lower and upper mold halves and has a cavity axis, and a core pin having a precisely centered needle-like tip section at the upper end extends upwardly from the lower mold half coaxially through the mold cavity. Its needle-like tip section extends into a precisely centered small diameter bore of a nose piece at the upper end of the mold cavity when the mold halves are closed. The nose piece can be adjusted vertically within the upper mold half to vary the distance the core pin tip extends thereinto to vary the length of the forward end of the molded article.

3 Claims, 16 Drawing Figures

METHOD FOR MOLDING A PLASTIC FERRULE FOR USE IN CONNECTORS FOR OPTICAL FIBERS

This application is a continuation of application Ser. No. 667,245, filed Nov. 1, 1984, abandoned.

FIELD OF THE INVENTION

The present invention is related to the field of molding, and more particularly, to molding plastic articles requiring a core pin.

BACKGROUND OF THE INVENTION

Molded plastic ferrules for use in connectors for optical fibers are known which have a very small diameter bore therethrough through which an end portion of an optical fiber is inserted and secured to terminate the optical fiber so that the fiber may be optically interconnected to another optical fiber or to an optoelectric device such as a light-emitting diode or a light-receiving device. For acceptable optical interconnection of two optical fibers, the fibers must be precisely aligned to minimize loss of transmitted light. U.S. Pat. No. 4,447,121 dicloses a resilient ferrule which is designed to center the optical fiber therewithin so that the fiber is aligned with a mating optical fiber when the ferrule is aligned with a comparable ferrule in an appropriate fiber optic connector. Such optical fibers may have a diameter as small as 0.005 inches and even smaller.

Therefore, it is desired to mold such a resilient plastic ferrule with a bore in its forward nose portion having a diameter such as just larger than 0.005 inches where the bore is supercentered within the ferrule, that is, where the axis of the bore is coaxial with the axis of the ferrule, or less than 0.00005 inches therefrom.

SUMMARY OF THE INVENTION

A core pin can be made from the method of the present invention wherein a precision manufactured forward needle-like punch section is secured within a supercentered bore in the forward end of a separate precision machined main body section. The supercentered bore can be formed by supercentering the main core pin body in tooling disclosed herein and securing the tooling in an apparatus such as an electrical discharge boring machine (EDM) and "burning" a bore using an electrode.

The core pin assembly is then secured in a cavity of a mold of an injection molding machine such that a plastic ferrule may be molded around the core pin assembly. Such a plastic ferrule will have a supercentered bore through a forward nose portion. With the mold cavity extending from a lower mold half to an upper mold half along a cavity axis, the core pin extends coaxially within the cavity from the lower to the upper mold half. According to the molding method of the present invention, the coaxially supercentered needle-like tip section of the core pin is also coaxial with the cavity axis and will extend into a precisely centered small diameter bore of a nose piece at the upper end of the mold cavity secured to the upper mold half when the upper and lower mold halves are closed. The distance which the core pin tip section will extend into the bore of the nose piece can be varied to correspondingly vary the length of the forward end of the plastic article to be molded, by adjusting the nose piece vertically in the upper mold half.

DESCRIPTION OF THE PREFERRED EMBODIMENT

Figure 1:
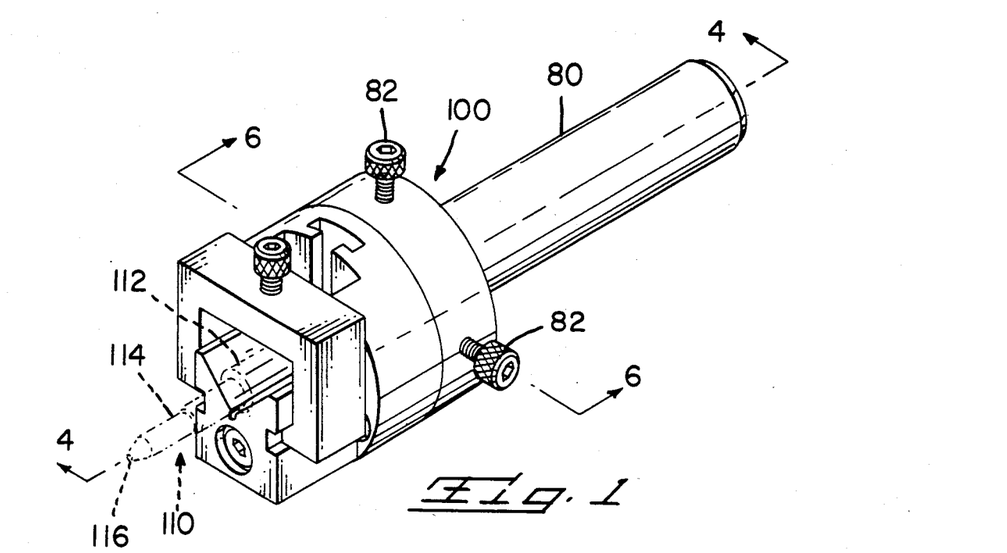
FIG. 1 is a perspective view of the supercentering tooling assembly with a workpiece in phantom.
Figure 2:
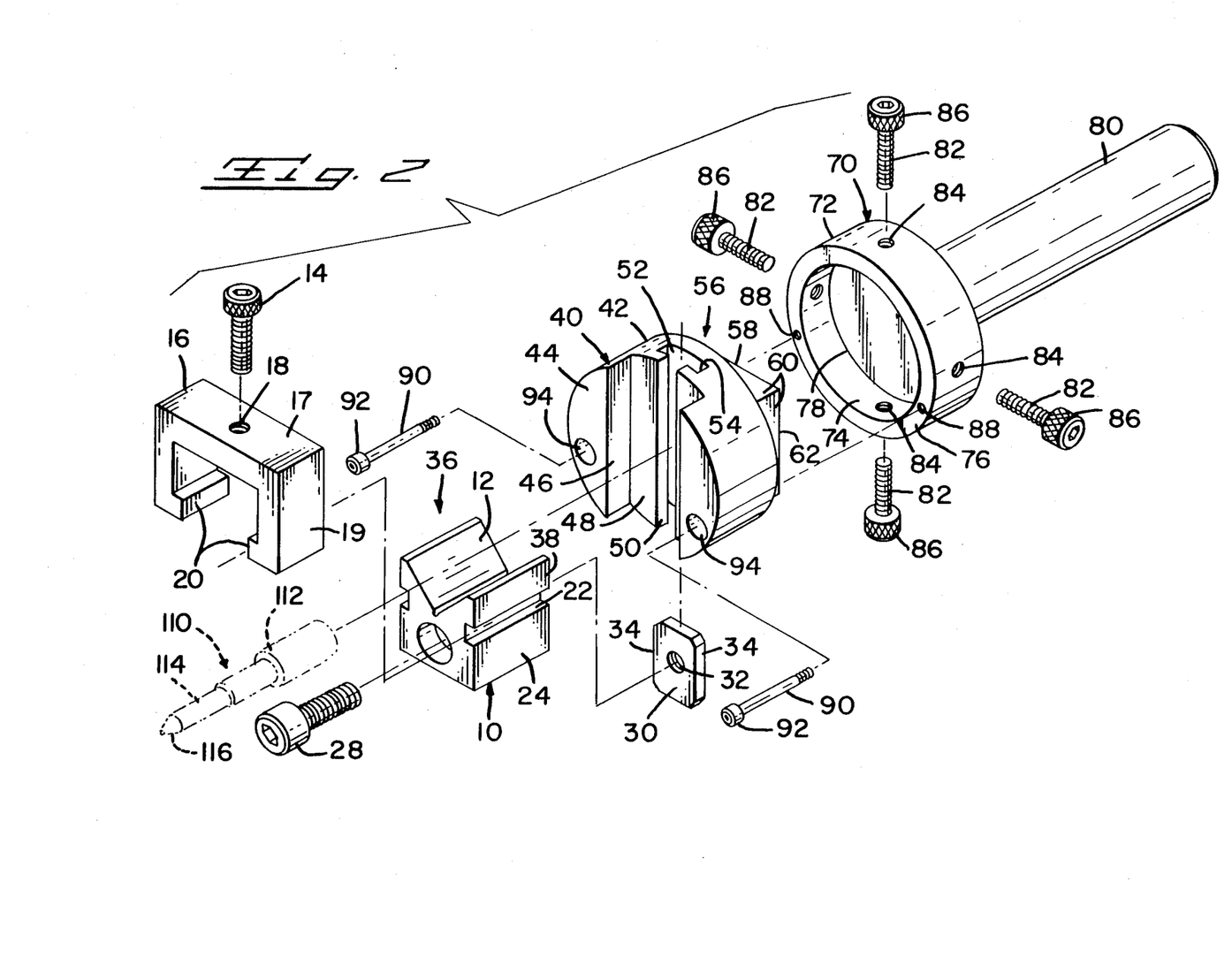
FIG. 2 is an exploded perspective view of the assembly of FIG. 1.
Figure 3:
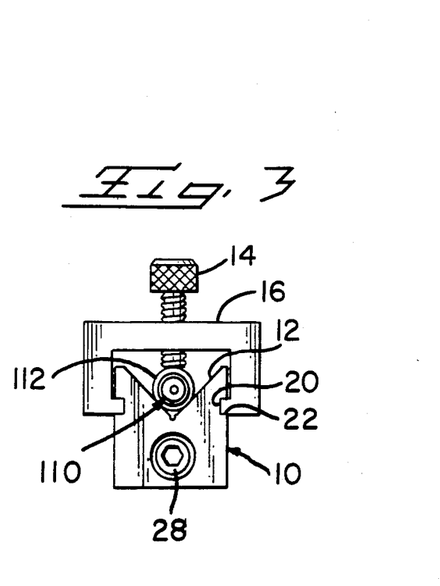
FIG. 3 is a frontal view of the clamping subassembly showing a workpiece secured therewithin.

Supercentering tooling assembly 100 is shown in FIG. 1, with a cylindrical article, workpiece 110 (in phantom) secured in a forward end thereof, as is disclosed in U.S. patent application Ser. No. 667,249 filed 11-1-84, now U.S. Pat. No. 4,583,432. With reference to FIG. 2, workpiece 110 (in phantom) is securable in a large longitudinal V-shaped groove 12 of a V-block 10 (comprising a first centering means) by a workpiece-clamping screw 14 of a clamping bracket 16. Clamping screw 14 extends axially normally inwardly through a threaded hole 18 of bracket 16 to engage reference surface 112 of workpiece 110 and secures the workpiece in groove 12, as shown in FIG. 3. Reference surface 112 should be a precision machined surface, preferably cylindrical, which is parallel to the axis of a concentric cylindrical work portion 114 of workpiece 110 which is used by the assembly 100 as a reference surface. With the vee shape of the groove where the apex of the vee is centered "horizontally" in V-block 10, disposed in a vertical longitudinal plane containing the longitudinal axis of V-block 10. Workpiece 110 is now aligned axially parallel with groove 12 and has a work portion 114 whereon (or whereby) work is to be performed extending forwardly from a front surface of V-block 10. The side surfaces forming the vee should be precision machined to be flat, smooth and axially parallel to V-block 10. Modified V-blocks and clamping brackets may be usable with workpieces having several axially parallel flat side surfaces as reference surfaces, such as those having a square cross-section where the modified vee shape has a 90° angle and two clamping screws extend from the bracket inwardly at 90° angles to engage two of the flat surfaces of the workpiece.

Clamping bracket 16 has a lateral top portion or bight 17, opposing parallel side portions 19 depending from the top portion, and inwardly extending longitudinal shoulders 20 which are inserted into corresponding longitudinal parallel channels 22 formed along parallel side surfaces 24 of V-block 10. Bracket 16 may be moved longitudinally along V-block 10 until a preferred position is obtained near the foward end of V-block 10.

V-block 10 has a large longitudinally extending threaded hole therethrough preferably with a recessed forward end in the forward surface of V-block 10 so that a securing screw 28 is disposed with its head preferably disposed in the recess. A flat, rectangular locking piece 30 has a threaded hole 32 therethrough centrally thereof, parallel long sides 34 a selected width apart, and preferably beveled corners. Locking piece 30 is loosely threadedly secured on the end of securing screw 28 so that it is substantially in an axially normal orientation. Clamping bracket 16 securely clamping workpiece 110 to V-block 10 results in a clamping subassembly 36 having a rearward end 38 (having an axially normal rearward surface) from which projects an end portion of securing screw 28 with locking piece 30 thereon. Parallel side surfaces 24 of V-block 10 have a selected width and form sides of rearward end 38.

A centering member 40 comprises a second centering means and preferably has a cylindrical portion 42 and flat axially normal forward surface 44. Extending from one side to the other in forward surface 44 is a large channel 46 having a flat axially normal bottom 48 and parallel sides normal thereto. Bottom 48 has a narrow central gap 50 therein in communication with an interior slot 52 wider than central gap 50 and extending from one side of member 40 to the other parallel with central gap 50. Large channel 46 is just wide enough for rearward end 38 of clamping subassembly 36 to fit therein; narrow gap 50 is just wide enough for a threaded portion of securing screw 38 to extend therethrough; and interior slot 52 is just wide enough and deep enough for locking piece 30 to be inserted from a side end of slot 52 and retained therein when oriented so that long sides 34 of locking piece 30 are disposed adjacent sides 54 of interior slot 52. Engagement of the axially normal rearward surface of rearward end 38 with axially normal forward surface 44 maintains a reference with reference surface 112 of workpiece 110.

Clamping subassembly 36 is secured to member 40 by sliding rearward end 38 thereof into large channel 46 from one end thereof, with locking piece 30 in a proper orientation entering an end of interior slot 52 and then an intermediate portion of securing screw 38 entering an end of narrow central gap 50. Clamping subassembly 36 is located along large channel 46 such that a center axis of workpiece 110 is substantially centered with respect to the outer surface of cylindrical portion 42 of member 40. A head portion of securing screw 38 is now turned such as by an Allen wrench, rotating in a tightening manner with repsect to locking piece 30. Locking piece 30 is prevented from turning within slot 52 by sides 54 thereof; tightening is continued until clamping subassembly 36 is tightly secured to member 40 forming a centering subassembly 56.

Centering member 40 has a large centering projection 58 having a selected length extending rearwardly therefrom and axially centered therewith. Centering projection 58 preferably has a square block shape with flat axially parallel side surfaces 60 and an axially normal rear surface 62. Cylindrical portion 42 has preferably two oversized securing holes 64 extending longitudinally therethrough proximate the outer surface thereof on two opposing sides of centering projection 58 whose locations are selected not to be centered with respect to any of the side surfaces of centering projection 58.

Holder 70 has a cylindrical sleeve-like forward adjustment portion 72 having a wide cylindrical recess 74 extending thereinto from a forward end thereof forming an annular forward surface 76 in a plane axially normal to holder 70. Recess 74 has a bottom surface 78 which also is axially normal, and a depth greater than the length of projection 58. A rearwardly projecting clamping projection, concentric right-cylindrical arm 80 is axially centered with respect to holder 70 and will be clamped by a collet chuck or other tooling of an apparatus with which the supercentering tooling assembly may be used.

Adjustment screws 82 extend through associated threaded holes 84 in sides of sleeve-like forward portion 72 of holder 70. There are preferably four adjustment screws, with holes 84 preferably spaced 90° from each other about the circumference in an axially normal plane, so that adjustment screws 82 are disposed therein in an axially normal orientation. Adjustment screws are preferably finely threaded and have knurled wide or very wide head portions 86 for manual or tool-assisted rotation. It is foreseeable that the adjustment screws may be made with features for automated adjustment. Also, other means may be used capable of incremental movement thereof and capable of retaining the selected position.

Figures 4, 5, 5A:
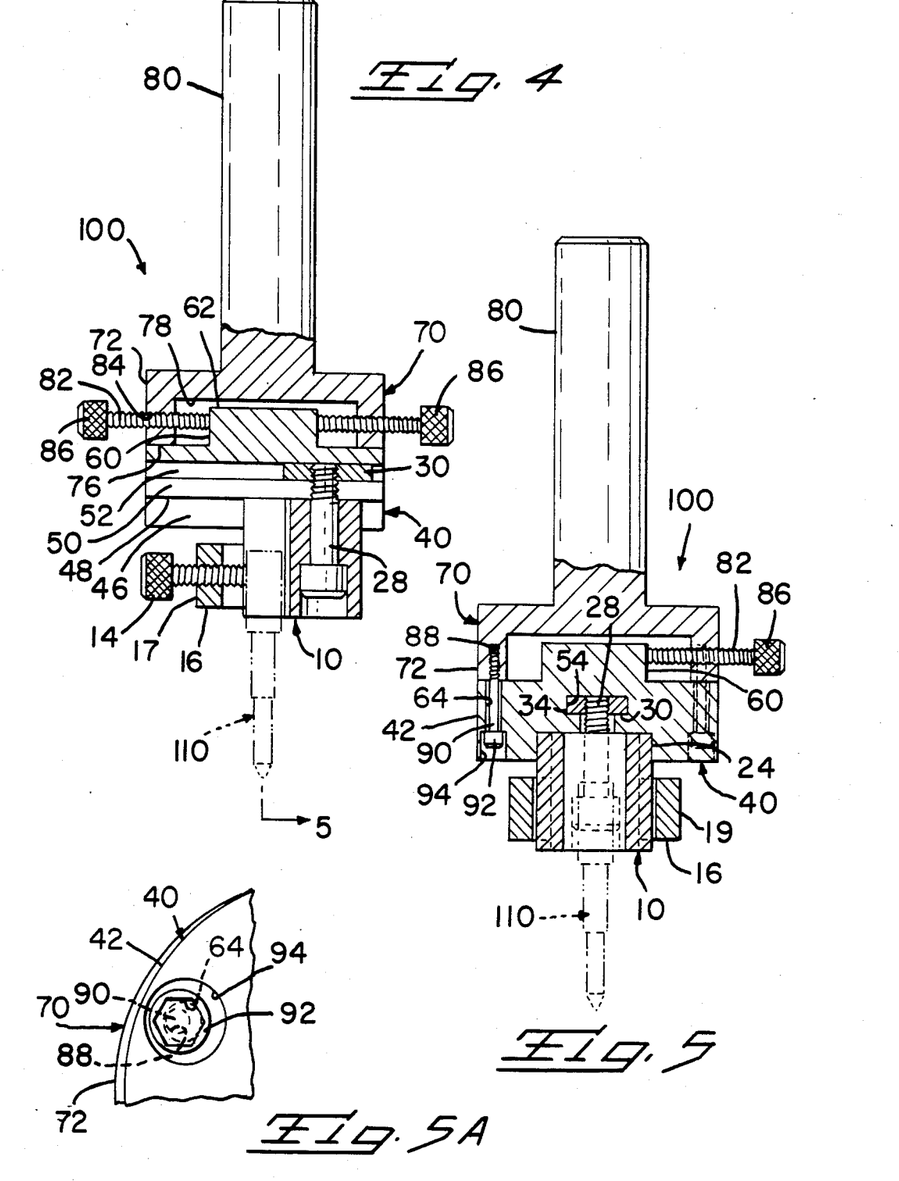
FIG. 4 is a longitudinal section view of the assembly taken along line 4—4 of FIG. 1.
FIG. 5 is a longitudinal section view taken along line 5—5 of FIG. 4.
FIG. 5A is an enlarged diagrammatic view of the securing means between the holder and the centering subassembly.

Sleeve-like portion 72 of holder 70 has threaded holes 88 through annular forward surface 76 associated and aligned with securing holes 64 of centering member 40. Shoulder screws 90 are associated with holes 64 and 88 and have wide heads 92 which will be disposed in wide recesses 94 around holes 64 in the forward surface 44 of cylindrical portion 42 of centering member 40, preferably one on each side of large channel 46. Securing holes 64 are substantially wider than the shanks of shoulder screws 90; heads 92 of shoulder screws 90 are wider than holes 64; and wide recesses 94 have a diameter wider than heads 92, all as best seen in FIG. 5. Centering member 40 may be secured to holder 70 by shoulder screws 90 in such a manner as to disallow axial movement therebetween but not to be so tightly held that axially normal adjustment of centering member 40 with respect to holder 70 cannot be manually made. By reason of the wide diameter of holes 64, shoulder screws 90 may "float" therein laterally to some extent without permitting axial movement of centering member 40 with respect to holder 70, as represented in the diagram of FIG. 5A. In FIG. 5A, centering member 40 is viewed from forward thereof in the vicinity of one of the oversized securing holes 64 showing recess 94, hole 64 and cylindrical surface 42, and securing screw 90 with head 92, and the side surface of forward portion 72 of holder 70 rearward thereof; securing screw 90 is off of center with respect to oversized securing hole 64 and recess 94, and centering member 40 is laterally displaced with respect to holder 70. (Shoulder screws 90 may be tightened further after the supercentering adjustment is made as described below.)

Figure 6:
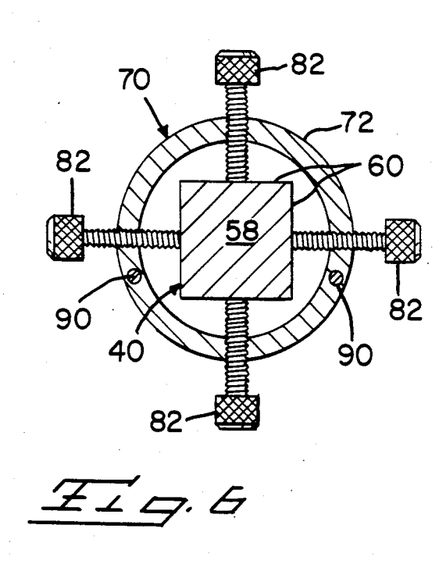
FIG. 6 is a cross-sectional view of the assembly's adjustment area, taken along line 6—6 of FIG. 1.

A rear surface of cylindrical portion 42 of centering member 40 is axially normal and engages axially normal annular forward surface 76 of holder 70 when assembled thereto by shoulder screws 90 which continues the reference with reference surface 112 of workpiece 110. (Right cylindrical clamping arm 80 extends the reference to the concentric tooling on the work end of the rotatable cylinder of the apparatus, which cylinder defines an axis of rotation.) Centering projection 58 is disposed in wide cylindrical recess 74 spaced from bottom surface 78 thereof with side surfaces 60 facing associated threaded holes 84 in sleeve-like forward portion 72 of holder 70 such that holes 84 are centered with respect to associated side surfaces 60. Adjustment screws 82 extend inwardly through threaded holes 84 and engage side surfaces 60 centrally thereof, as seen in FIG. 6.

Figure 6A:
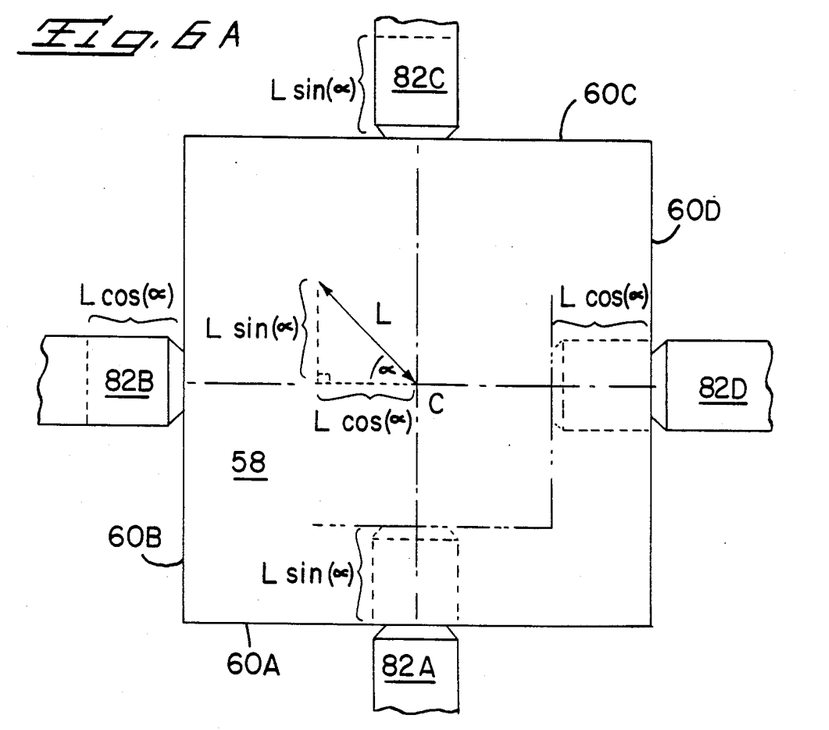
FIG. 6A is an enlarged diagrammatic view showing an adjustment being made in the adjustment area shown in FIG. 6.

Centering projection 58 and corresponding centering subassembly 56 and hence workpiece 110 can be moved in incremental amounts in an axially normal plane by appropriate incremental rotation of selected adjustment screws 82 in an appropriate sequential combination. With reference to the diagram of FIG. 6A, if it is desired to move center point C of centering projection 58 in an upward left direction at an angle ($\alpha$) to the "horizontal" a distance L (exaggerated for purposes of explanation), this is accomplished by rotating adjustment screws 82A, 82B, 82C and 82D in the following manner: Screw 82B is slightly loosened; screw 82C is rotated so as to move outwardly a distance equal to $L \times \sine(\alpha)$; screw 82A is rotated to move inwardly a distance equal to $L \times \sine(\alpha)$ and remain slightly loosened; screw 82B is rotated to move outwardly a total distance equal to $L \times \cosine(\alpha)$; screw 82D is rotated to move inwardly a distance equal to $L \times \cosine(\alpha)$; and screw 82A is tightened.

Distance L is an incremental distance, the limits of which are determined by the manner of securing the centering member 40 to holder 70. The upper limit in the present embodiment of the supercentering tooling is less than the difference between the diameter of wide holes 88 in holder 70 and the diameter of shank portions of associated shoulder screws 90 (and usually less than one-half that difference) which is the total axially normal distance which member 40 is able to "float" with respect to holder 70. Other manners of securing the cylinder to the holder may permit greater upper limits on distance L. However, if greater centering adjustment of the workpiece is needed, this should be only needed in the "vertical" direction with respect to V-groove 12, referring to FIG. 3. Such greater adjustment may be accomplished by loosening securing screw 28 and adjusting the position of clamping subassembly 36 along large channel 46 of centering member 40, and tightening securing screw 28. If wide holes 88 were provided with a "horizontal" oblong shape, then greater "horizontal" incremental movement of centering projection 58 could be permitted.

The various parts of the supercentering tooling assembly are preferably precision machined of oil-hardened steel, and the screws are preferably of heat-treated alloy steel and have knurled heads with hexagonal recesses for either manual or tool-assisted rotation. It may be seen that adjustment screws 82 may be provided with very wide heads for even more precise manual adjustment.

Once assembled as shown in FIG. 1, assembly 100 with workpiece 110 secured in its forward end is ready for supercentering adjustment of the work portion 114. Cylindrical arm 80 is gripped in a collet chuck or other appropriate tooling on the rotating cylinder of the apparatus (not shown). For purposes of this example, the apparatus is an electrical discharge machine (EDM) such as that commercially available from System 3R International AB of Vallingby, Sweden or from Eltee Pulsitron of West Caldwell, N.J. The work step is the "burning" of a very small axial bore into the forward end 116 of the work portion 114 of workpiece 110 by a work-related member, electrode 150 secured on an X-Y table below the cylinder.

Assembly 100 was supercentered in an EDM by very slowly rotating the apparatus cylinder and detecting eccentricity of work portion 114 by use of a gage. The gage used was a BESTEST indicator (trademark) sold by Brown & Sharpe Mfg. Co. of North Kingstown, R.I. (EDP No. 45981) with a dial having a smallest indicating division or graduation of 0.00005 inches, a repetition accuracy of 0.00002 inches, and a calibration accuracy of 0.0001 inches. With the contact of the gage applied against work portion 114, the maximum deviation from concentricity was measured and rotation was stopped at the angle at which the point of maximum deviation occurred. Adjustments were made using adjustment screws 82 in the manner described above to move centering subassembly 56 the distance equaling one-half the maximum deviation in the appropriate direction, to achieve concentric positioning of work portion 114. Very slow rotation was renewed and gage measurements again taken and readjustments made accordingly, repeating the steps described until concentricity was obtained which occurred when no measurable reading was observed on the gage.

Figure 7A:
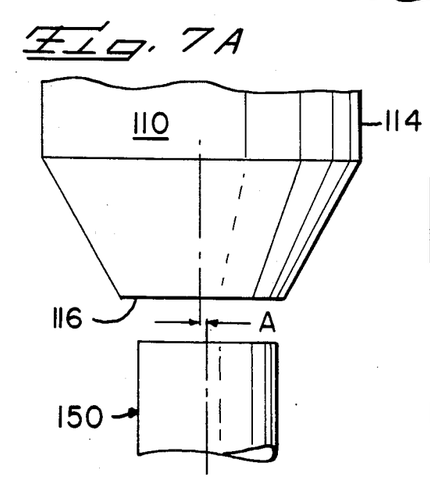
FIGS. 7A and 7B are diagrams illustrating the "burning" of a bore in a forward tip of a workpiece by an electrode.
Figure 7B:
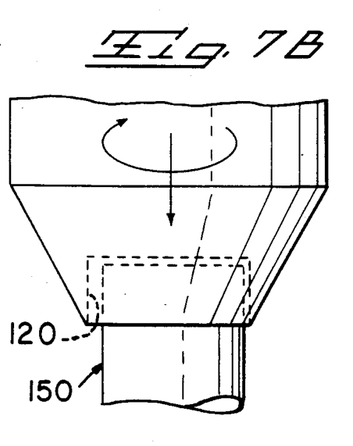

Referring to FIGS. 7A and 7B, an electrode 150 was selected having a diameter of 0.038 inches and an effective "burning" diameter of 0.0385 inches. Electrode 150 was secured in a centered position on the lower X-Y table holding fixture (not shown). The "burning" technique used was to center the electrode in the X-Y plane 0.00095 inches off of center from the centerline of supercentered forward end 116 of workpiece 110 (incremental distance A of FIG. 7A), and to rotate the workpiece while slowly lowering it to the electrode 150, effecting a relative slight eccentric movement of electrode 150 with respect to forward end 116. A "burned" bore was obtained having a diameter of 0.0404 inches and a depth of 0.500 inches, and the bore was supercentered with respect to work portion 114 of workpiece 110.

It is also possible to "burn" a bore in forward end 116 which is located a precise incremental distance off of center with respect to the axis of work portion 114, by using the gage to first supercenter the work portion with respect to both the rotatable cylinder and the electrode, and then move the axis (using adjustment screws 82) precisely the desired incremental distance off of center, by again using the gage, and also centering the electrode an amount off of center equivalent to increment A in FIG. 7A to allow for the electrode to "move" slightly within the bore as it "rotates" and "burns". Then by rotating the rotatable cylinder, the work portion 114 will be rotated eccentrically, and when lowered onto the electrode a bore will be "burned" which is the prescribed distance from the axis of work portion 114.

Figure 8A:
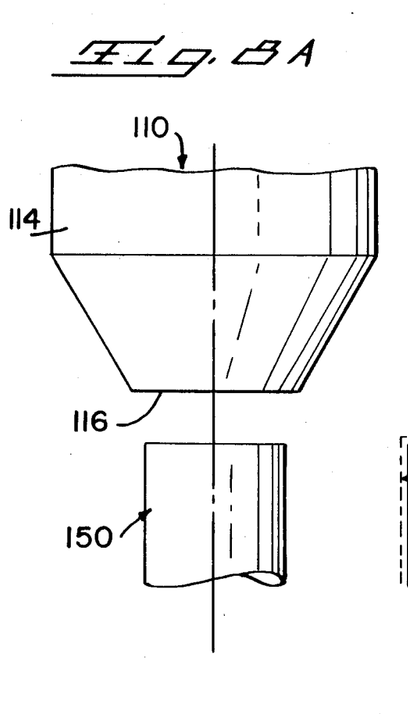
FIGS. 8A, 8B and 8C are diagrams illustrating the "burning" of a needle tip on the end of a workpiece by an electrode.
Figure 8B:
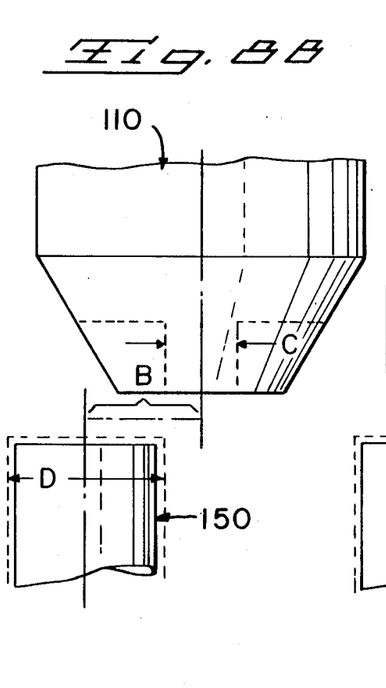
Figure 8C:
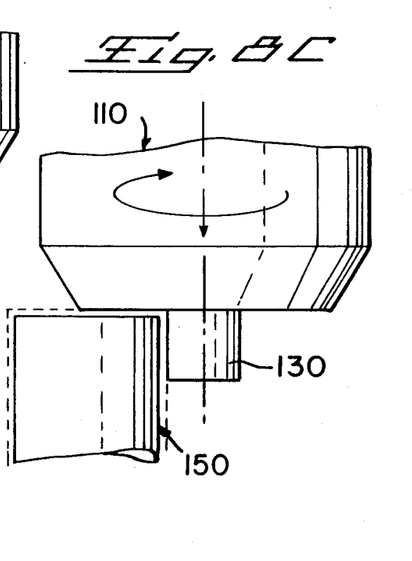

Using the same arrangement and technique as described to supercenter the work portion 114 of a workpiece 110, but with a relatively much greater distance off of center (incremental distance B of FIG. 8B), a "needle" tip 130 could be formed by "burning" surrounding material of forward end 116 using electrode 150 to leave tip 130 remaining, as shown in the diagrams of FIGS. 8A, 8B and 8C. Incremental distance B would be equal to the sum of the desired radius of the "needle" tip 130 (one-half of diameter C) and one-half of the effective "burning" diameter D of the electrode 150. While the surface of the "needle" tip 130 it is believed would be rough, pitted and uneven, a controlled plating procedure known in the art could be used to provide a workable, smooth, even surface on the needle tip.

Other operations may be performed with other apparatus which may take advantage of the supercentering workpiece holder, such as precision lathe cutting or milling to form a smaller diameter concentric cylindrical portion of a workpiece forward of a larger diameter concentric portion (whether coaxial therewith or axially parallel but eccentrically spaced), or holding an electrode which must be rotated during operation to perform a task, or even a precision drill bit for very low torque drilling. Even for operations having torque applied to an article held therein, accessory apparatus can be foreseeable which applies torque directly to the article such as a precision drill bit after the bit has been supercentered with the assembly of the present invention without necessarily removing the bit from the assembly, so long as the clamping means of the accessory apparatus precisely locates itself with respect to the bit and conforms its position firmly thereat in order to apply torque. Many other uses will occur to those skilled in the art.

Variations may occur in the structure of the supercentering tooling assembly. In particular, variations may be developed in the clamping of a workpiece in the assembly, or the securing of the parts of the assembly together, or in the nature of the adjustment screws, or even in automating the adjustment of the adjustment screws rather than by manual adjustment, to be responsive to gages which may be used to control the adjustment. The essential result is that centering of an article such as a workpiece can be consistently obtained to a greater extent than is known in the art.

Figure 9:
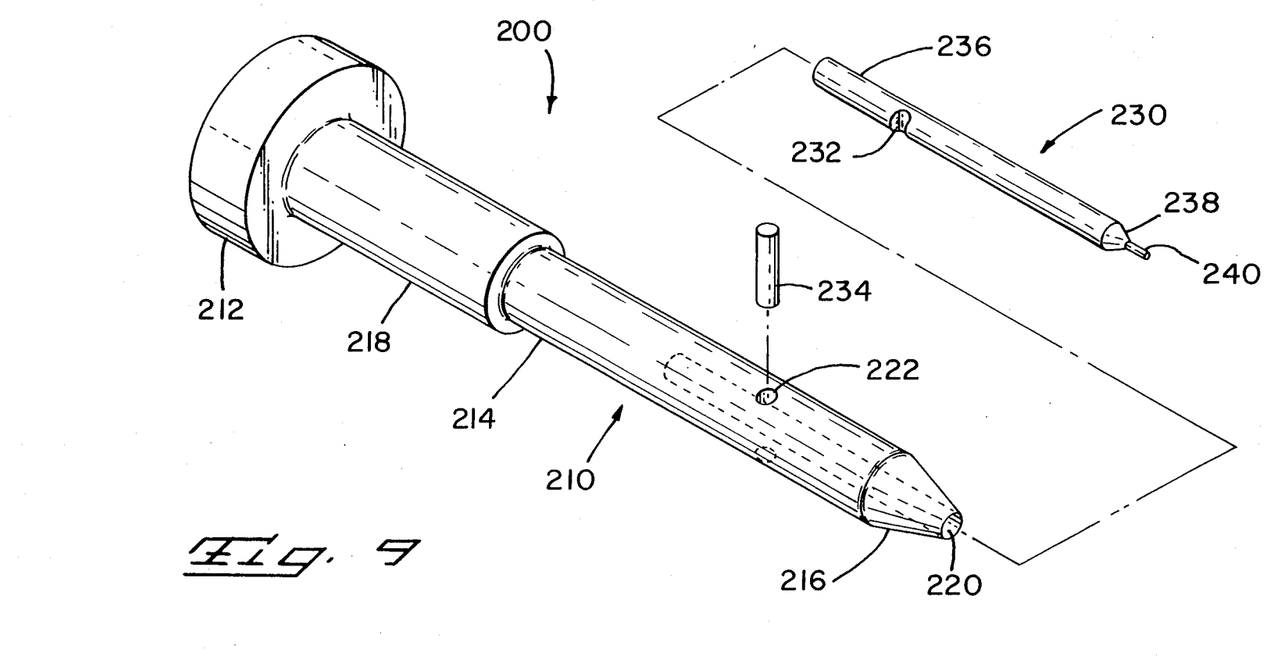
FIG. 9 is a perspective view of a core pin made using the method of the invention.

A specific example of a workpiece having a supercentered bore therein is shown in FIG. 9. Core pin assembly 200 has a main body member 210 having a bore 220 "burned" therein. Central body section 218 and forward body section 214 were precision ground when main body member 210 was held supercentered in tooling assembly 100, which was clamped in a concentrically rotatable cylinder of a precision grinding apparatus. Tooling assembly 100 was then removed and placed in a rotatable cylinder of an EDM apparatus described above, with main body section 210 retained in its supercentered position in tooling assembly 100, although main body section 210 could be removed from assembly 100 and then replaced and again supercentered therein. Bore 220 was then "burned" into a forward end of forward body section 214 following the procedure described hereinabove with the EDM apparatus. Tooling assembly 100 with main body member 210 therein was then removed from the EDM and placed in a concentrically rotatable cylinder of a precision grinder, and a tapered frustoconical section 216 as shown in FIG. 9 was formed by being precision ground at the forward end of forward body section 214 around the front of bore 220.

Figure 10:
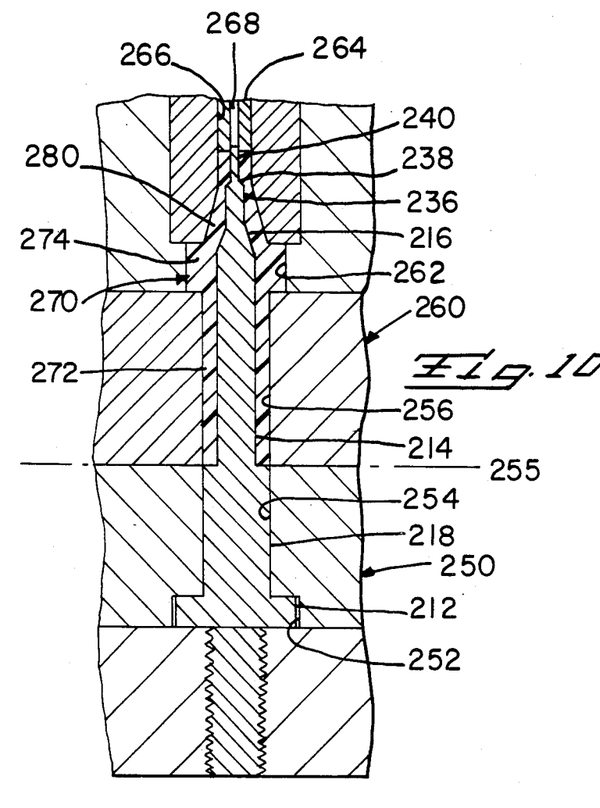
FIG. 10 is a cross-sectional view of the core pin of FIG. 9 secured in a mold cavity.

Rear body section 212 was then ground to a preselected precise shorter length with a precision grinder apparatus, in order to prepare the core pin assembly 200 for insertion into a mold apparatus, as represented in FIG. 10.

Bore 220 had a diameter of 0.0404 inches, and a punch member 230 with a diameter of 0.0400 (just less than that of bore 220) was fitted into bore 220. At a precisely selected distance from the forward end of main body member 210 is located a small diameter hole 222 in communication with bore 220. A slot 232 was ground from side to side through the side of forward punch member 230 and halfway thereinto at a distance along cylindrical punch section 236 to correspond with hole 222. To secure punch member 230 into bore 220 when punch member 230 has been inserted far enough into bore 220 for slot 232 to be aligned with hole 222, a malleable slightly tapered short brass pin 234 was inserted through hole 222 and extends through slot 232 by being tapped wedgingly thereinto; and any portion thereof extending outward from main body member 210 on either side was carefully filed off. Punch member 230 was now thus secured in bore 220 to form core pin assembly 200, and was supercentered therein.

Punch member 230 preferably comprises a precise length of tungsten steel precision ground on a centerless grinder using known methods, has a small diameter cylindrical section 236, and has at the forward end thereof a tapered frustoconical portion 238 and a very small diameter needle tip 240 centered on the axis thereof. Needle tip 240 has a preselected diameter corresponding to the core diameter of an optical fiber for which it is desired to mold a resilient ferrule. In the present example needle tip 240 had a diameter of 0.005 inches and a length of 0.040 inches, cylindrical punch section 236 had a diameter of 0.0400 inches and a length of 0.500 inches, and tapered punch section 238 had a 30° taper from axial. Bore 220 had a diameter of 0.0404 inches and a depth exceeding 0.500 inches, and tapered frustoconical body section 216 of main body member 210 had a 20° taper from axial. When punch member 230 was located and secured in bore 220, a forward end of cylindrical punch section 236 extended forwardly from the end of tapered body section 216 of main body section 210.

As shown in FIG. 10, core pin assembly 200 is secured in a mold apparatus such as a Sadmal precision molding machine manufactured by Sadmal of La Chaux-de-Fonds, Switzerland. Rear body section 212 of the core pin is a concentric cylindrical surface and was utilized as a reference surface during the supercentering procedure described above, and is secured in a profiled recess 252 of a lower mold half 250, which recess is precisely referenced to upper mold half 260. Central body section 218 extends upwardly therefrom fitting very closely in passageway 254; forward body section 214 of reduced diameter extending further upwardly is disposed concentrically within a passageway 256 coaxial with profiled recess 252 and passageway 254. Forward section 214 is cylindrical and concentric with a side surface spaced a radially constant distance from the wall of passageway 254 forming a lower section 272 of a mold cavity 270. Mold cavity 270 has a central cavity axis extending therethrough. Upper mold half 260 and lower mold half 250 are moved along a selected direction normal to the cavity axis into abutting relationship at parting line 255 when the mold is closed. A portion of forward body section 214 extends above parting line 255, tapered portion 216, a forward portion of cylindrical punch section 236 and 238 extend upward therefrom and needle tip 240 extends further upward therefrom.

Profiled upper section 274 of mold cavity 270 is formed therearound by profiled walls 262 of upper mold half 260. A separate cooperating means nose piece 264 is secured in a large bore 266 of upper mold half 260 at an end of mold cavity 270, having a small diameter bore 268 therethrough to receive an end of needle tip 240 of core pin assembly 200 concentrically and close fittingly therewithin. When the mold is so closed, polymerizable plastic resin 280 is injected into mold cavity 270 and a plastic article is molded using conventional molding techniques. Because of the viscosity of the resin, no plastic material flows into the very slight space between needle tip 240 and bore 268 of nose piece 264 and between central body section 218 and passageway walls 254. Nose piece 264 is replaceable within upper mold half 260 so that a variety of core pin assemblies of different sizes of needle tips 240 may be used in the same mold apparatus, which needle tips correspond to varying sizes of optical fiber cores which are available; and also nose piece 264 may be adjusted vertically along large bore 266 to increase or decrease the distance by which needle tip 240 extends into small diameter bore 266, correspondingly decreasing or increasing the length of the forward end and the length of the small diameter forward bore section therewithin, of the plastic article to be molded.

Figure 11:
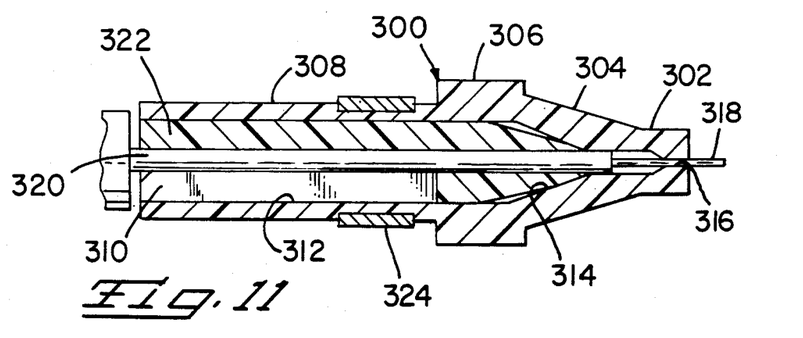
FIG. 11 is a cross-sectional view of a plastic ferrule molded in the mold cavity of FIG. 10, with an optical fiber terminated thereto.

As shown in FIG. 11, a plastic ferrule 300 has been molded in the mold cavity of FIG. 10 using the core pin assembly of the invention. Ferrule 300 has a forward nose tip 302, an outer frustoconical section 304, a large shoulder 306, and a long cylindrical rear section 308. Profiled bore 310 of ferrule 300 has a rear bore section 312, a frustoconical forward inner surface 314, and a supercentered forward bore section 316 extending through ferrule nose tip 302 and having a very small diameter, to receive the stripped forward end 318 of an optical fiber 320 close fittingly therewithin. Contained within long cylindrical rear section 308 of ferrule 300 is an insert 322 surrounding fiber 320. A crimping sleeve or ring 324 is crimped to secure insert 322 to fiber 320 and within long rear section 308 of ferrule 300. With ferrule 300 thus secured to insert 322 and fiber 320 it may be further assembled into a fiber optic connector as described in U.S. Pat. No. 4,447,121 after that portion of fiber and 318 extending forwardly from forward nose tip 302 has been carefully removed and the resulting end preferably polished flush with the front surface of forward nose tip 302.

Variations in the method of the present invention may occur to those skilled in the art without departing from the spirit of the invention nor the scope of the claims.

What is claimed is:

1. A method of molding an article having a bore therethrough defining a longitudinal axis and having a precisely centered small diameter bore section at one end thereof, comprising the steps of:
   selecting a core pin having a body section having a selected profile therealong defining a longitudinal axis, a securing section at one end thereof axially parallel to said axis comprising a reference surface, and a small diameter needle-tip section extending forwardly from the other end thereof precisely coaxial with said axis;
   selecting a mold apparatus and a mating pair of opposing first and second mold halves movable together and apart along a selected direction in precisely referenced relationship, said mold halves when closed forming a mold cavity disposed along said selected direction and defining a cavity axis;
   securing said securing section of said core pin in said first mold half such that said body section extends into said mold cavity from one end thereof and said longitudinal axis thereof is coaxial with said cavity axis;
   providing a cooperating means in said second mold half at the other end of said mold cavity, said cooperating means having a small diameter bore precisely centered with respect to said cavity axis and having a diameter just larger than the diameter of said needle-like tip of said core pin, such that said cooperating means receives said tip in a close fit a selected distance thereinto upon closing said mold halves together;
   closing said mold halves;
   injecting moldable material into said mold cavity;
   molding said article in said mold cavity around said core pin extending completely through said mold cavity, such that a precisely centered small diameter bore section is formed during molding thereof at one end of said article; and
   opening said mold halves and removing said completely formed article therefrom.

2. A method as set forth in claim 1 wherein said cooperating means is adjusted along a large bore at said end of said mold cavity and coaxially with said cavity axis to vary the distance by which the core pin tip extends into said small diameter bore of said cooperating means to correspondingly vary the length of said small diameter bore section of said molded article.

3. A method as set forth in claim 1 wherein the diameter of said small diameter needle-like tip is selected to correspond to the diameter of an optical fiber core to be inserted through said bore of said molded article.

* * * * *